United States Patent
Aiello et al.

(10) Patent No.: US 11,061,303 B2
(45) Date of Patent: *Jul. 13, 2021

(54) QUICK SWAP TOP MOUNTABLE CAMERA MOUNT SYSTEMS

(71) Applicant: Panavision International, L.P., Woodland Hills, CA (US)

(72) Inventors: Dominick Aiello, Oak Park, CA (US); Haluki Sadahiro, Oak Park, CA (US); Trach Nguyen, Sylmar, CA (US)

(73) Assignee: Panavision International, L.P., Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/559,460

(22) Filed: Sep. 3, 2019

(65) Prior Publication Data
US 2020/0064716 A1 Feb. 27, 2020

Related U.S. Application Data

(63) Continuation of application No. 14/591,864, filed on Jan. 7, 2015, now Pat. No. 10,401,714.
(Continued)

(51) Int. Cl.
*G03B 17/56* (2021.01)
*F16M 11/04* (2006.01)
(Continued)

(52) U.S. Cl.
CPC ......... *G03B 17/563* (2013.01); *F16M 11/041* (2013.01); *F16M 13/04* (2013.01);
(Continued)

(58) Field of Classification Search
CPC .................................................. G03B 17/563
See application file for complete search history.

(56) References Cited

U.S. PATENT DOCUMENTS

| 3,612,462 A | 10/1971 | Mooney et al. |
| 5,390,578 A | 2/1995 | Raymer |

(Continued)

FOREIGN PATENT DOCUMENTS

| JP | 2012134815 A | 7/2012 |
| JP | 2013074599 A | 4/2013 |

(Continued)

OTHER PUBLICATIONS

International Search Report dated Jun. 11, 2015 in corresponding International Application No. PCT/US2015/010536 filed Jan. 7, 2015; total 5 pages.

(Continued)

*Primary Examiner* — Noam Reisner
(74) *Attorney, Agent, or Firm* — Snell & Wilmer L.L.P.

(57) ABSTRACT

In contrast to the traditional transitions used in systems that switch over a camera with a handheld top mount to a low mode mount, a quick swap top mountable camera mount system includes a quick swap handheld top mount, a quick swap mounting plate, and a quick swap low mode mount. Unlike traditional methods and components, fewer pieces are required to be removed and replaced due, in part, to the use of quick swap coupling elements, which allow various types of mounts to quickly and easily decouple from the quick swap mounting plate.

20 Claims, 19 Drawing Sheets

Related U.S. Application Data

(60) Provisional application No. 61/924,379, filed on Jan. 7, 2014.

(51) Int. Cl.
*F16M 13/04* (2006.01)
*H04N 5/225* (2006.01)
*H01R 13/639* (2006.01)

(52) U.S. Cl.
CPC ......... *G03B 17/561* (2013.01); *G03B 17/566* (2013.01); *H01R 13/639* (2013.01); *H04N 5/2252* (2013.01)

(56) References Cited

U.S. PATENT DOCUMENTS

| | | | |
|---|---|---|---|
| 5,737,657 A | 4/1998 | Paddock et al. | |
| 5,801,774 A | 9/1998 | Seo | |
| 6,686,967 B1 | 2/2004 | Yamamoto | |
| 6,805,997 B1 | 10/2004 | Katayama | |
| 10,401,714 B2 * | 9/2019 | Aiello | F16M 11/041 |
| 2009/0002524 A1 | 1/2009 | Desorbo | |
| 2009/0116831 A1 | 5/2009 | Lindsay | |
| 2009/0257741 A1 | 10/2009 | Greb et al. | |
| 2014/0093314 A1 * | 4/2014 | Kessler | F16M 13/00 403/361 |
| 2014/0233934 A1 * | 8/2014 | Aiello | F16M 11/041 396/419 |

FOREIGN PATENT DOCUMENTS

| | | | |
|---|---|---|---|
| WO | 1996031050 A1 | 10/1996 | |
| WO | 2007125305 A1 | 11/2007 | |
| WO | 2013086173 A1 | 6/2013 | |
| WO | 2015105922 A1 | 7/2015 | |

OTHER PUBLICATIONS

Written Opinion of the International Searching Authority dated Jun. 11, 2015 in corresponding International Application No. PCT/US2015/010536 filed Jan. 7, 2015; total 5 pages.

International Preliminary Report on Patentability dated Jul. 12, 2016 in corresponding International Application No. PCT/US2015/010536 filed Jan. 7, 2015; total 6 pages.

Non-Final Office Action dated Jul. 21, 2015 in corresponding U.S. Appl. No. 14/591,864, filed Jan. 7, 2015; total 13 pages.

Final Office Action dated Jan. 29, 2016 in corresponding U.S. Appl. No. 14/591,864, filed Jan. 7, 2015; total 17 pages.

Advisory Action dated Apr. 22, 2016 in corresponding U.S. Appl. No. 14/591,864, filed Jan. 7, 2015; total 4 pages.

Non-Final Office Action dated Jun. 17, 2016 in corresponding U.S. Appl. No. 14/591,864, filed Jan. 7, 2015; total 17 pages.

Final Office Action dated Dec. 30, 2016 in corresponding U.S. Appl. No. 14/591,864, filed Jan. 7, 2015; total 19 pages.

Advisory Action dated Mar. 17, 2017 in corresponding U.S. Appl. No. 14/591,864, filed Jan. 7, 2015; total 3 pages.

Non-Final Office Action dated May 11, 2017 in corresponding U.S. Appl. No. 14/591,864, filed Jan. 7, 2015; total 18 pages.

Final Office Action dated Feb. 9, 2018 in corresponding U.S. Appl. No. 14/591,864, filed Jan. 7, 2015; total 8 pages.

Non-Final Office Action dated Jul. 26, 2018 in corresponding U.S. Appl. No. 14/591,864, filed Jan. 7, 2015; total 15 pages.

Final Office Action dated Jan. 29, 2019 in corresponding U.S. Appl. No. 14/591,864, filed Jan. 7, 2015; total 19 pages.

Notice of Allowance dated Apr. 24, 2019 in corresponding U.S. Appl. No. 14/591,864, filed Jan. 7, 2015; total 7 pages.

* cited by examiner

QUICK SWAP TOP MOUNTABLE CAMERA MOUNT SYSTEMS

CROSS-REFERENCE TO RELATED APPLICATIONS

This patent application is a continuation of U.S. patent application Ser. No. 14/591,864 filed Jan. 7, 2015, now U.S. Pat. No. 10,401,714, which claims the benefit of U.S. Provisional Patent Application No. 61/924,379, filed Jan. 7, 2014, which applications are hereby incorporated by reference in their entirety.

FIELD OF THE INVENTION

The field of the present invention is camera mount systems, and particularly camera mount systems that permit a camera to be quickly and easily transferred between different types of camera mounts positioned on top of a camera.

BACKGROUND

Switching between different types of top-mounted camera mounts can be a source of delay during filming. It can easily take several minutes to disconnect a camera from one top mount and then reconnect the camera to another top mount, depending, in part, upon mount types and fasteners used.

Body-mounted camera stabilizing systems, such as the STEADICAM line of camera stabilizing systems, sold by The Tiffen Company of Hauppauge, N.Y., and competing systems sold by Xtended Camera Support Inc. of Thousand Oaks, Calif. and GPI Pro Systems of Valencia, Calif. (collectively hereinafter, body-mounted camera stabilizing systems are referred to as "Steadicam systems" or singularly as a "Steadicam system"), often include a low mode mount, which is mounted onto the top of a camera. Unfortunately, changing over from an initial top mount to the low mode mount of a Steadicam system involves several steps.

The steps involved during the changeover from an initial top mount to a low mode mount can delay production. And these delays easily run up the cost of filming. While camera crews are working diligently to changeover camera top mounts, others on set are often left standing around until the changeover is complete. A system that enables the camera crew to quickly changeover from one type of camera top mount to a low mode mount of a Steadicam system is, therefore, desirable.

SUMMARY

Quick swap top mountable camera mount systems as disclosed herein, comprise a quick swap mounting plate including an outer body portion having long sides and short sides, wherein each long side includes a male alignment element and at least one long side includes a raised lip, and an inner body portion having a plurality of bores. The camera mount systems further comprise a quick swap handheld top mount configured to mate with the quick swap mounting plate. The quick swap handheld top mount comprises a quick swap accessory plate with an accessory plate platform, having an accessory plate channel configured to receive the quick swap mounting plate, the channel including a female alignment element that mates with the male alignment element of the quick swap mounting plate and one or more quick swap coupling elements configured to engage the quick swap mounting plate. In an example, the one or more quick swap coupling elements comprise at least one quick release and lock mechanism.

The camera mount systems may further comprise one or more of a handle connected to a top surface of the accessory plate platform, a quick swap low mode mount configured to mate with the quick swap mounting plate. In an example, the quick swap low mode mount comprises a docking block and one or more mount adjustment elements. The camera mount systems may further comprise a power distribution plate configured to mate with the quick swap mounting plate. In an example, the power distribution plate comprises at least one quick release and lock mechanism. In an example, the power distribution plate comprises a power distribution plate channel configured to receive the quick swap mounting plate, the power distribution plate channel including a female alignment element that mates with the male alignment element of the quick swap mounting plate. In an example, the power distribution plate includes a side wall having a series of undulations.

BRIEF DESCRIPTION OF THE DRAWINGS

The drawings described herein are for illustrative purposes only and not intended to limit the scope of the present disclosure.

DETAILED DESCRIPTION

Figure 1:
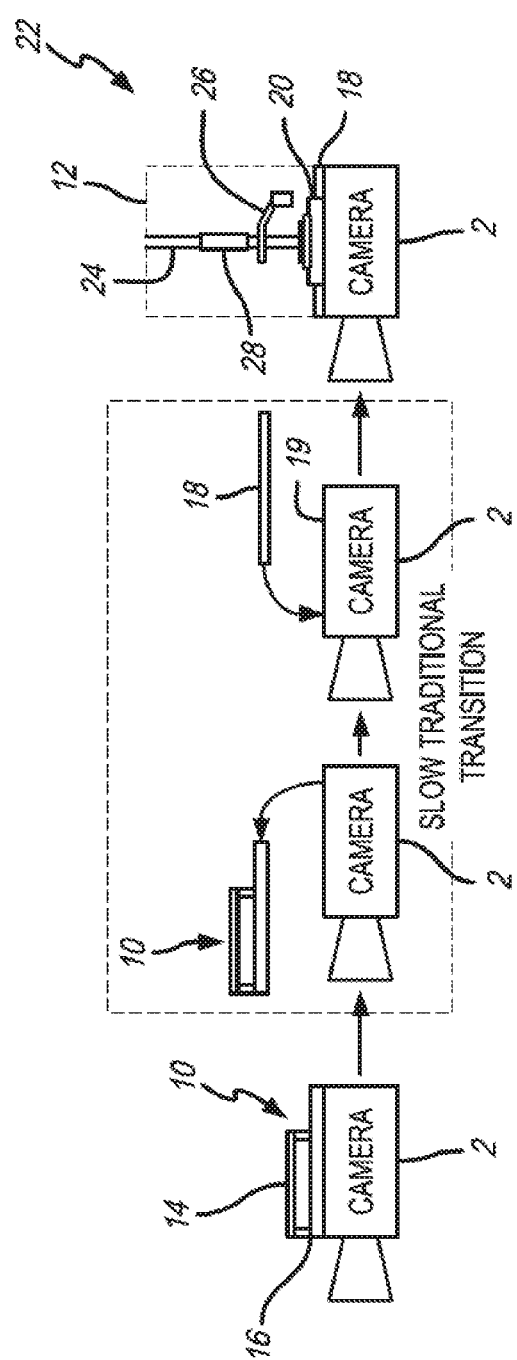
FIG. 1 schematically illustrates a traditional method for changing over from a handheld top mount to a low mode mount of a Steadicam system.

FIG. 1 schematically shows a prior art method and prior art components used to change over a camera 2 with a handheld top mount 10 to a low mode mount 12 of a Steadicam system. The handheld top mount 10 includes a camera handle 14 and a camera top accessory plate 16, which is attached to the handle. To change mount types, according to this prior art method, the accessory plate 16 of the handheld top mount 10 is screwed onto and off of the camera 2. After removal of the handheld top mount 10, a mounting plate 18 is screwed onto the camera top 19. The camera top 19 typically includes threads such that it is configured to receive screws. Finally, the low mode mount 12 is attached, using fastening elements (not shown).

A low mode mount 12 of a Steadicam system includes, among other elements, a docking block 20 and various mount adjustment elements 22. Mount adjustment elements 22 include, but are not limited to a shaft 24 that is mounted onto the docking block, a control handle 26 disposed on the shaft 24, and at least one gripping element 28. The docking block 20 is attached to the camera mounting plate 18, using fasteners (e.g. sliding dovetails). The time it takes to transition from a handheld mount to a low mode mount, using this method and these components is considerable and typically occurs in four or more stages, as illustrated in FIG. 1.

Figure 2:
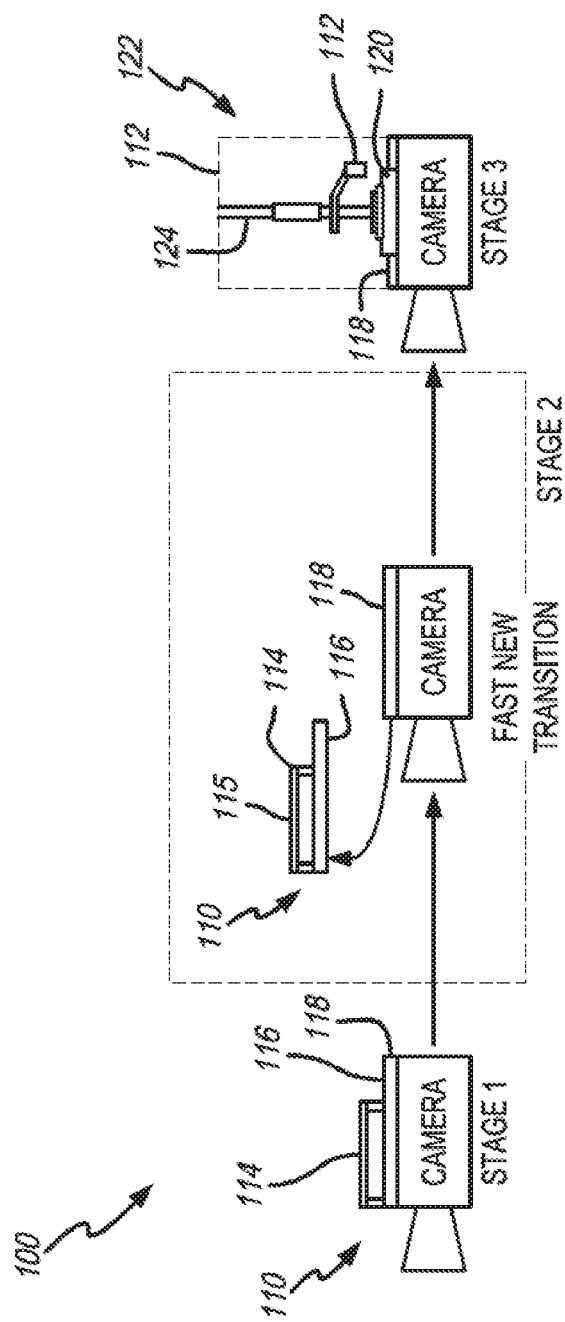
FIG. 2 schematically illustrates one embodiment of a quick swap top mountable camera mount system, which enables quick changes between a quick swap handheld top mount and a quick swap low mode mount.

In contrast to the traditional transitions used in systems that switch over a camera with a handheld top mount to a low mode mount, FIG. 2 schematically shows stages of one embodiment of a quick swap top mountable camera mount system 100. Generally, there are three (3) stages in this system configuration which allow a changeover from an initial mount type over to a subsequent mount type. This system configuration, however, should not be construed as limiting. The system is designed to be user-friendly and promote interchangeability with other elements, which may be incorporated into a quick swap top mountable camera mount system.

Elements of the system configuration 100 shown in FIG. 2 generally include a quick swap handheld top mount 110 (Stages 1-2), a quick swap mounting plate 118 (Stages 1-3), and a quick swap low mode mount 112 (Stage 3). Like the traditional method and components, the system 100 is used to changeover a handheld top mount 110 over to a low mode mount 112. But, unlike the traditional method and components, fewer pieces are required to be removed and replaced due, in part, to the use of quick swap coupling elements, which allow various types of mounts to quickly and easily decouple from the quick swap mounting plate.

Figure 4:
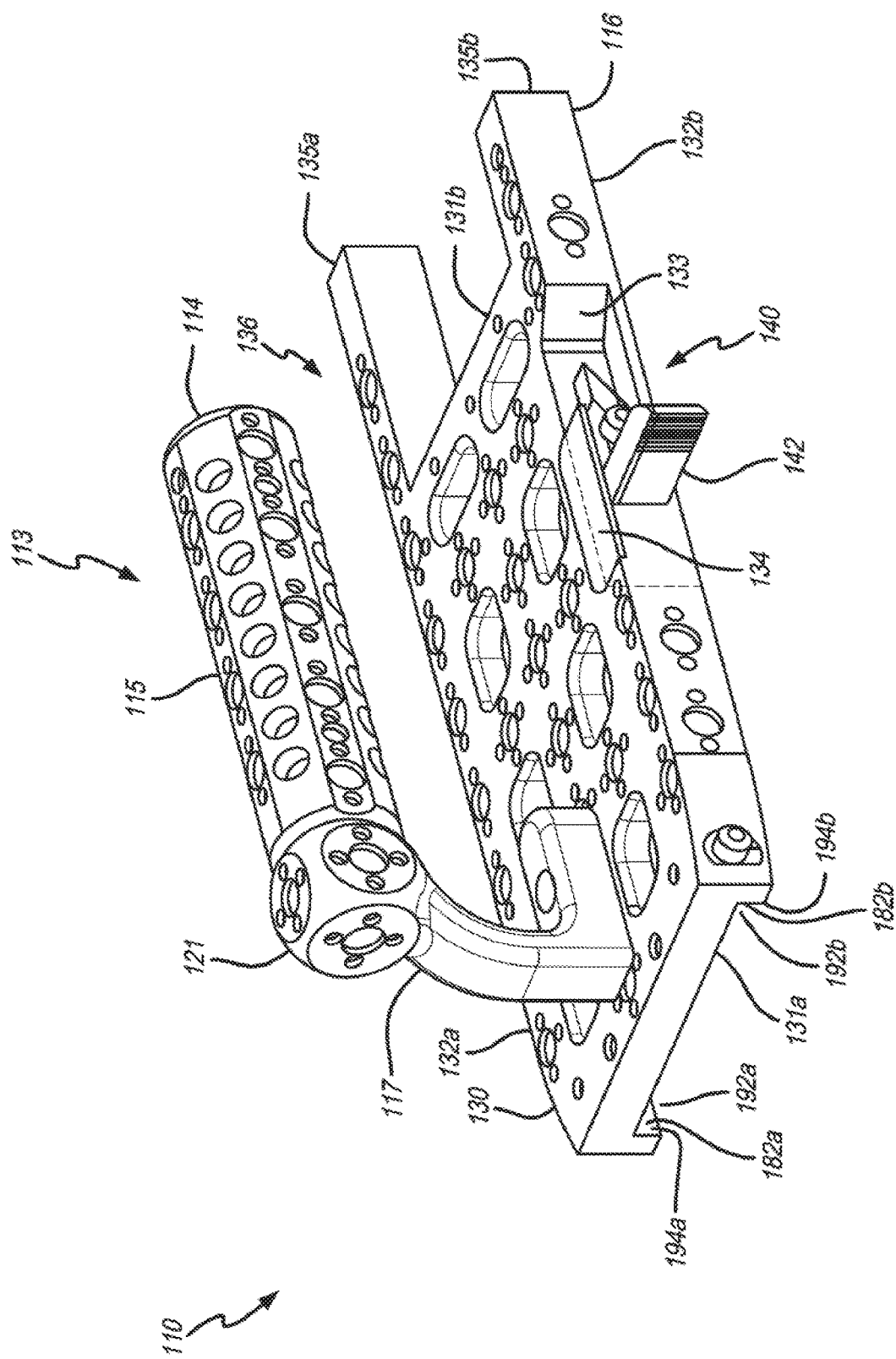
FIG. 4 shows one configuration of a quick swap handheld top mount, including a camera handle and a quick swap camera top accessory plate.

In this improved system, the quick swap handheld top mount 110 includes a handle 114 and a quick swap camera top accessory plate 116, which is connected to the handle. And exemplary quick swap handheld top mount 110 is shown in FIG. 4. The handle 114 may include a plurality of bores 113 for overall lightening of the handheld top mount 110 and an extending arm 117. The extending arm 117 extends from a connecting end 121 of the handle 114 and connects the handle to a mount surface of a plate (e.g. the accessory plate), using at least one fastener 119.

The handle 114 includes at least one gripping area 115, which allows a cameraman to carry the camera by hand. The quick swap camera top accessory plate 116 also includes one or more quick swap coupling elements 140 that allow the accessory plate 116 to mate with the mounting plate 118. These coupling elements 140 include at least one quick release and lock mechanism 142 that allows the accessory plate 116 to decouple from the mounting plate 118, as further described below. The handle 114 and the quick swap camera top accessory plate 116 may be either two separate pieces, which are connected together or integrated pieces, i.e. meaning that the handle and plate are molded or machined from one generally contiguous material.

Referring back to FIG. 2, Stage 1 of the system is shown with the handheld top mount 110 coupled to the quick swap mounting plate 118. In this stage, the quick swap mounting plate 118 is positioned under the handheld top mount 110. Stage 2 is shown with the handheld top mount 110 removed from the quick swap mounting plate 118. Preferably, the handheld top mount 110 is slidably engaged with the quick swap mounting plate 118, although other methods of engagement may be used. Stage 3 is shown with the quick swap low mode mount 112 coupled to the quick swap mounting plate 118.

Figure 3:
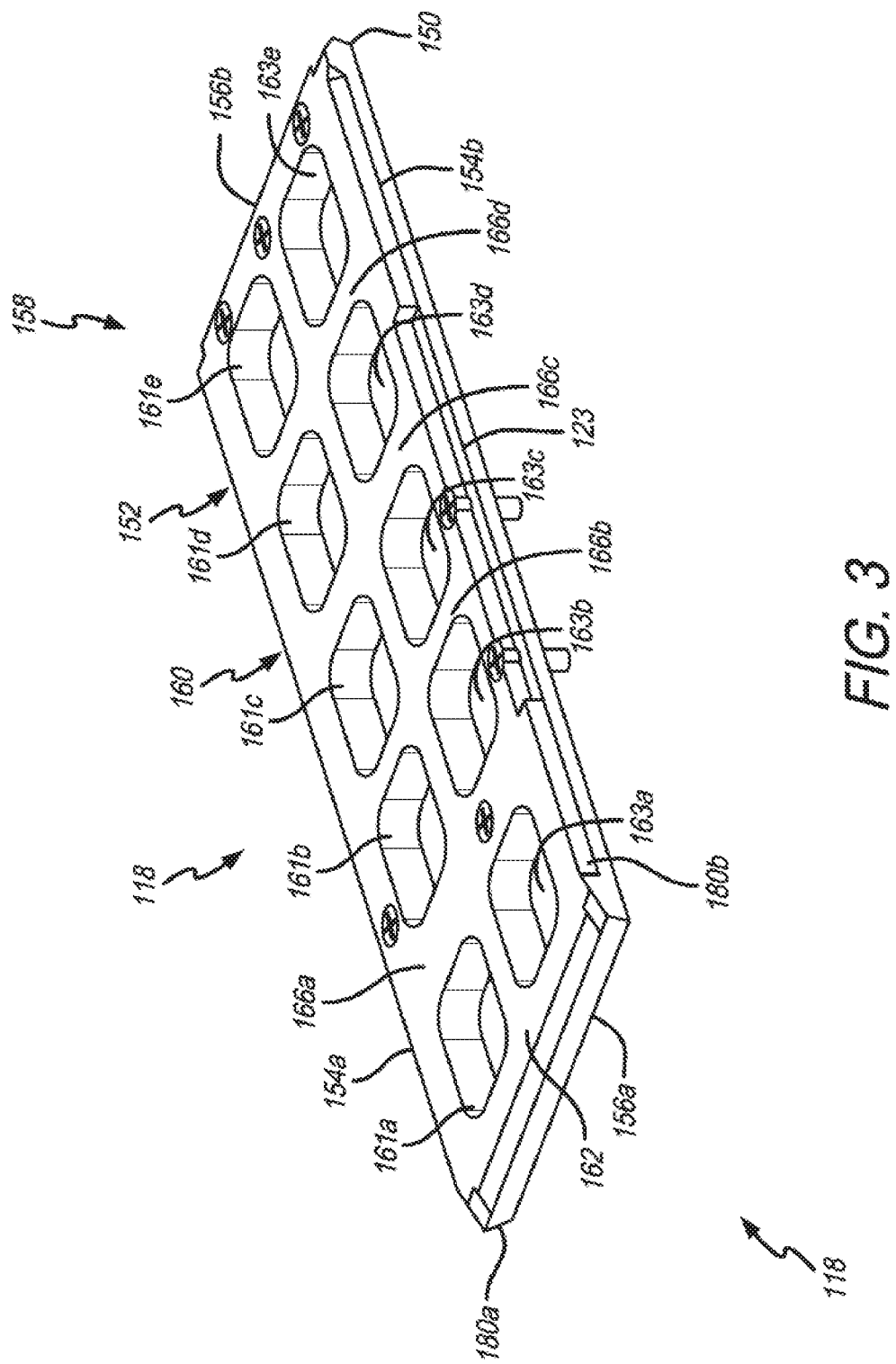
FIG. 3 shows one configuration of a quick swap mounting plate.

FIG. 3 shows one configuration of a quick swap mounting plate 118. This plate is preferably utilized through each stage of the system 100. In this configuration, the mounting plate 118 includes an outer body portion 150 with a plurality of sides 152. Here, the outer body portion 150 includes four sides—long sides 154a, 154b and short sides 156a, 156b. The inner body portion 158 has a plurality of quadrants 160, which each quadrant including an opening 161a, 161b, 161c, 161d, 161e, 163a, 163b, 163c, 163d, 163e for weight reduction purposes. This configuration of the mounting plate includes ten quadrants. Fewer or more quadrants, however, may be provided. Each quadrant is bounded by sides of the outer body portion, a central strip 162, which extends between short sides 156a, 156b and lateral structural elements 166a, 166b, 166c, 166d, which extend between long sides 154a, 154b. The inner body portion also includes a plurality of bores 170 with each bore having threads for coupling with fasteners and mounting onto a camera top (See, e.g., FIG. 6A).

Coupled to long sides 154a, 154b, respectively, are a primary male alignment element 180a and a secondary male alignment element 180b with the secondary male alignment element 180b including a raised lip 123. These male alignment elements and the raised lip 123 engage or interlock with the accessory plate and other alternative system plates, as further described below. A male alignment element may also be configured with a dovetail like shape, which includes an angular or curved side surface. The positioning and configuration of the male alignment elements, however, should not be construed as limiting. One or more male alignment elements may have alternative positioning and configurations, depending, in part, on overall the structural configuration required for positioning on top of the camera.

As shown particularly in FIG. 4, a quick swap accessory plate 116 includes an accessory plate platform 130, having a generally rectangular shape. The platform 130 is bounded by a front platform end 131a, a rear platform end 131b, a first platform side 132*a*, and a second platform side 132*b*. The second platform side 132*b* includes the quick release and lock mechanism 142, which is fitted partially within a cavity 133 (represented in part by dashed lines shown in FIG. 4) on the second platform side 132*b* of the platform. A cover 134 is positioned partially over the cavity to protect the interior components of the quick release and lock mechanism 142. Extending from the platform 130 are plate extensions 135*a*, 135*b*. And disposed on the platform 130 and the plate extensions is a plurality of apertures 136 of various sizes and shapes. These apertures are incorporated into the platform and pate extensions to lighten the overall load of the accessory plate 116. The apertures may also provide attachment points for coupling the accessory plate to the camera 2 and the mounting plate 118.

Figure 6A:
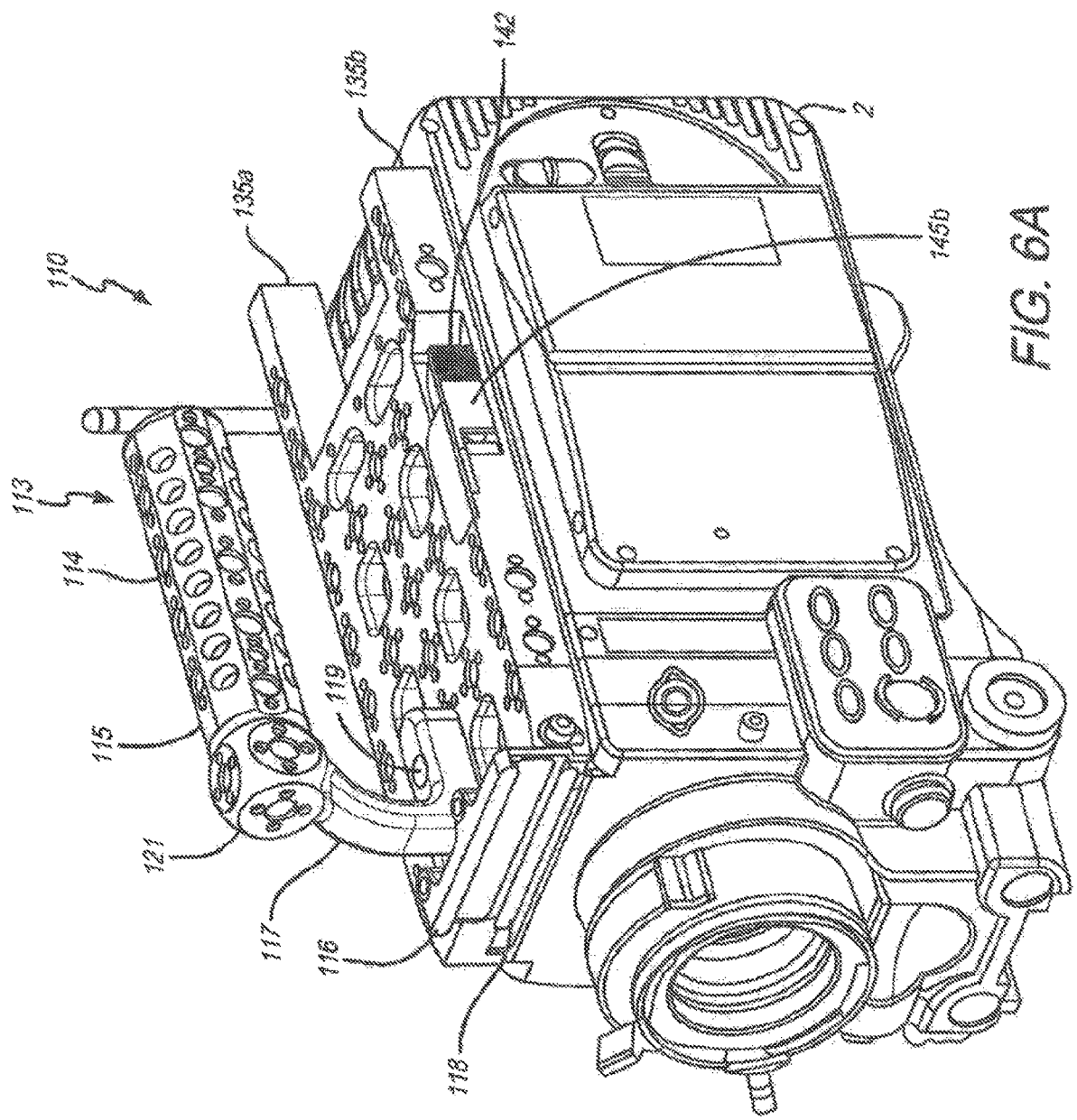
FIG. 6A shows a camera assembled with a quick swap mounting plate and handheld top mount.

The accessory plate platform 130 also includes a channel 129 configured to receive the quick swap mounting plate 118. Disposed within the channel 129 are a primary female alignment element 182*a* and a secondary female alignment element 182*b*. These female alignment elements are configured to couple with the quick swap mounting plate 118, as shown in FIG. 6A. Profiled surfaces 192*a*, 192*b* of each female alignment element respectively form a primary socket 194*a* and a secondary socket 194*b*. The primary socket 194*a* has as a complementary shape to receive the primary male alignment element of the quick swap mounting plate. Similarly, the secondary socket 194*b* has as a complementary shape to receive the secondary male alignment element 180*b* of the quick swap mounting plate 118.

Figure 5:
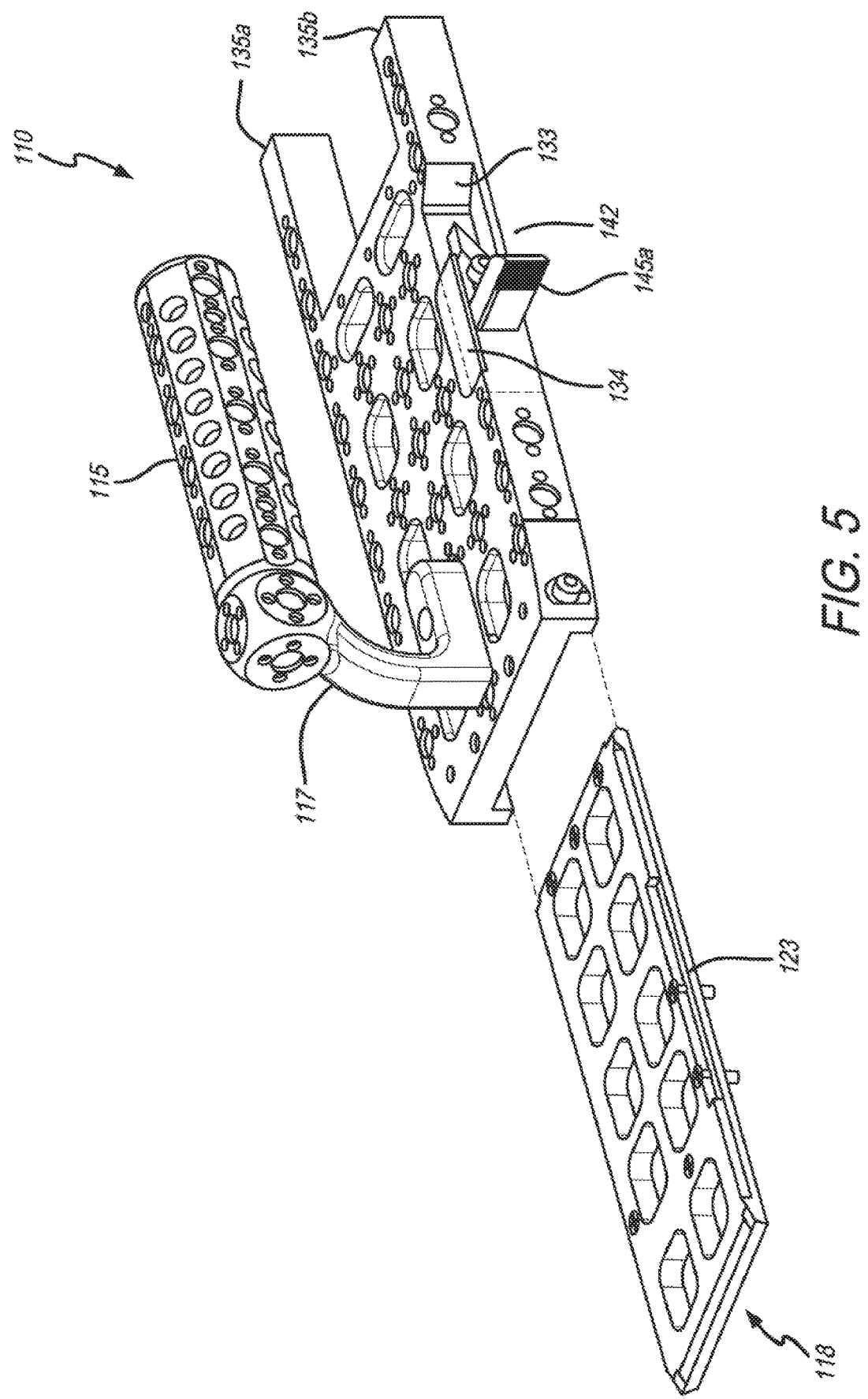
FIG. 5 shows the quick swap handheld top mount shown in FIG. 4 in alignment with the quick swap mounting plate shown in FIG. 3.
Figure 6B:
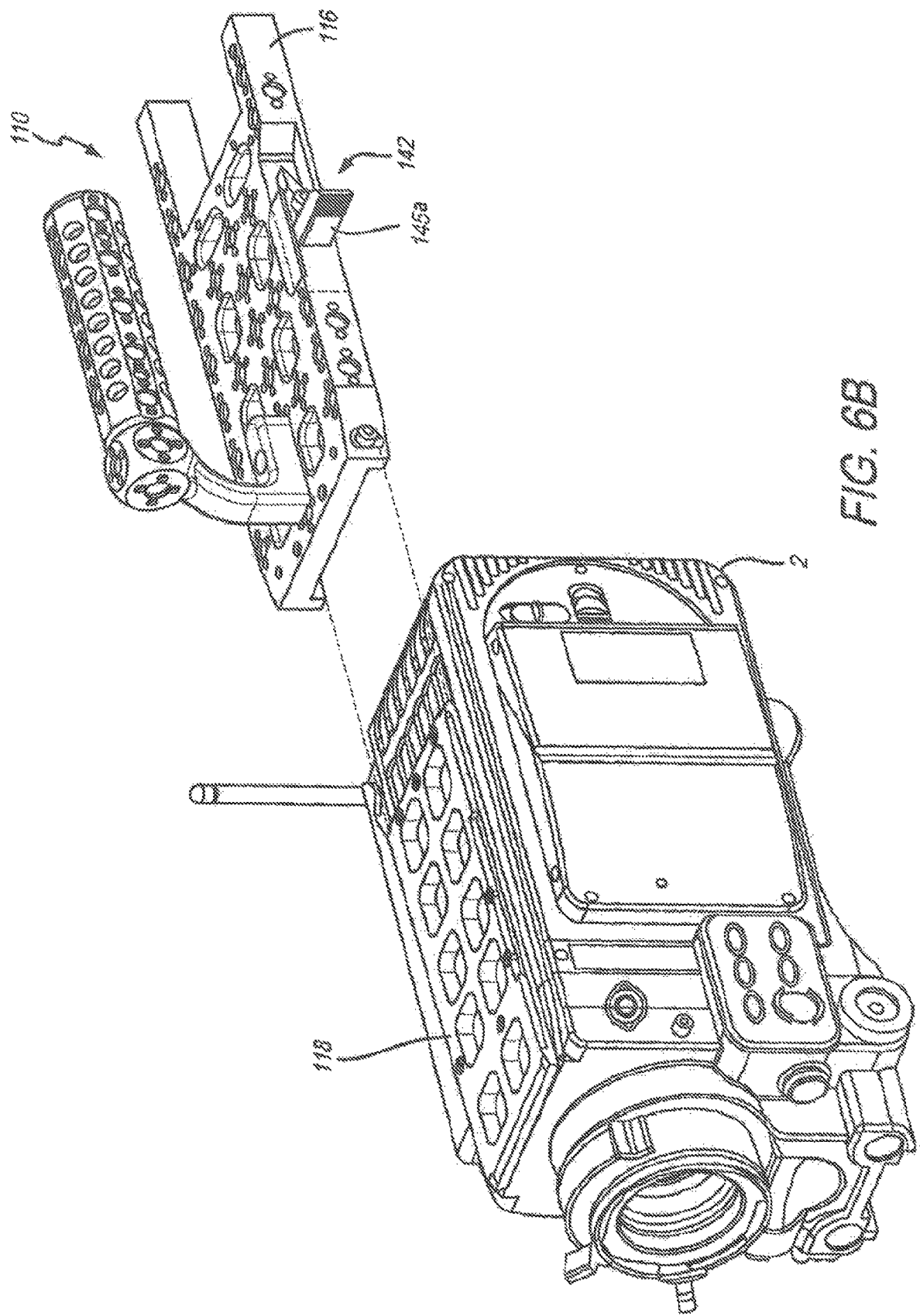
FIG. 6B shows a camera in alignment with a quick swap mounting plate and handheld top mount assembly.

FIGS. 5 and 6B show how the quick swap mounting and accessory plates may be aligned before assembly. And, FIGS. 6A and 6B, in particular, illustrate the transition of the system 100 from Stage 1 to Stage 2 and particularly how a quick swap handheld top mount 110 and the quick swap mounting plate 118 may be coupled to and decoupled from a camera 2. To initiate the transition and the coupling and decoupling of the quick swap handheld top mount, a quick release and lock mechanism 142 is activated.

Referring particularly to FIGS. 5, 6A, 6B, and 12, the quick release and lock mechanism 142 is activated by a lever 144 coupled to one or more rotary elements 146 fitted within the cavity 133. A rotary element 146 acts an axle, by engaging both the lever 144 and a block 148 positioned within the cavity 133 of the quick swap camera top accessory plate 116. The rotary element 146 rotates and moves the block 148 downwardly and inwardly toward the quick mounting plate 118. A user activates this motion, by moving the lever 144 from a first position 145*a* (shown in FIGS. 5 and 6B) to a second position 145*b* (shown in FIG. 6A). Decoupling of the accessory plate 116 from the mounting plate 118 is achieved by activating the quick swap release and lock mechanism 142 and then sliding the accessory plate 116 off of the quick swap mounting plate 118 (shown in FIG. 6B).

Figure 7:
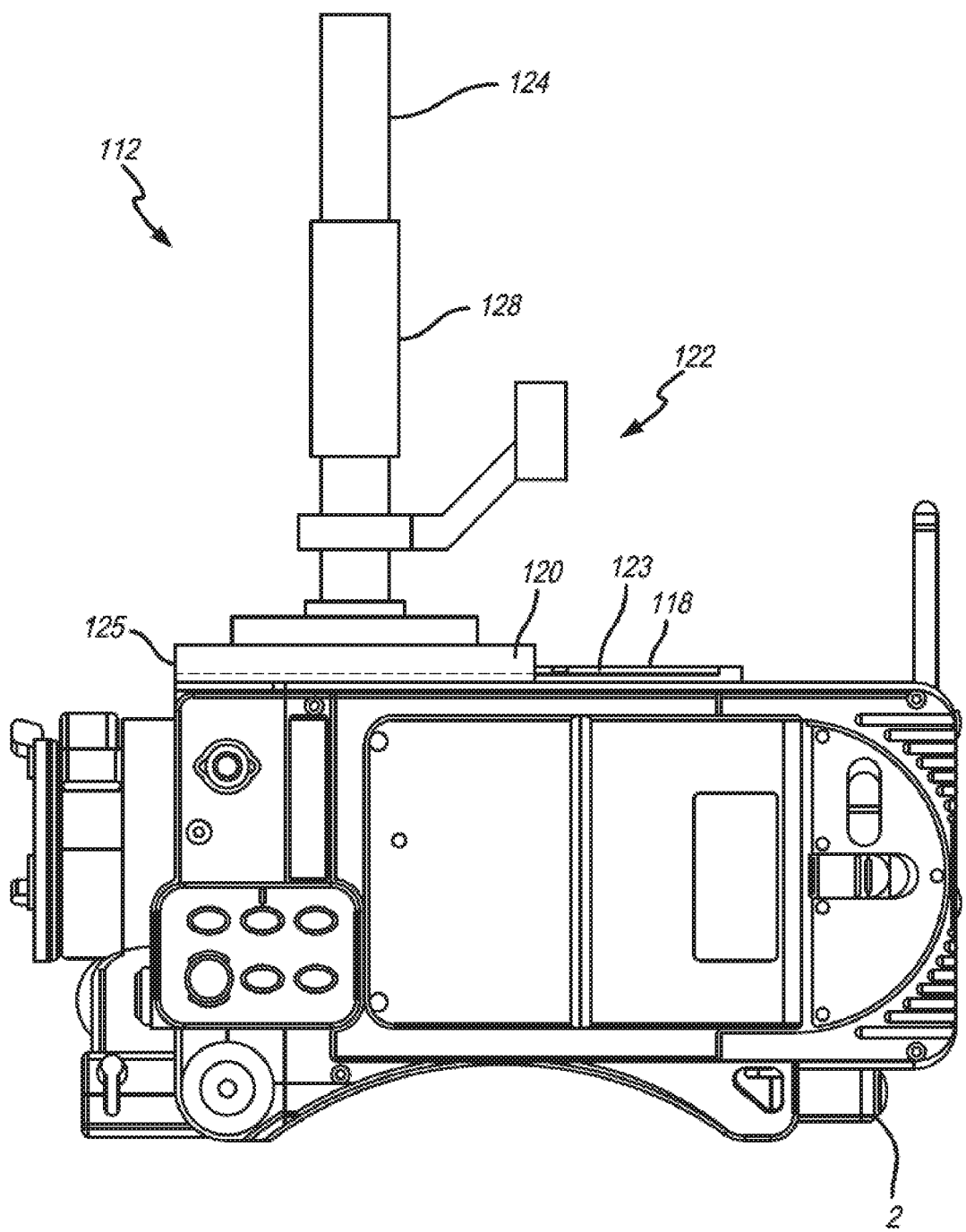
FIG. 7 shows a quick swap low mode mount coupled to a camera and a quick swap mounting plate.

FIG. 7 shows one configuration of a quick swap mounting plate 118 assembled to a quick swap low mode mount 112. After the quick swap handheld top mount 110 is removed from the quick swap mounting plate 118, as shown in FIG. 6B, the quick swap low mode mount 112 may positioned onto the mounting plate 118. The quick swap low mode mount 112 includes, among other elements, a docking block 120 and mount adjustment elements 122. Mount adjustment elements 122 include, but are not limited to a shaft 124 that is mounted onto the docking block, a control handle 126 disposed on the shaft 124, and at least one gripping element 128. A channeled underside 125 of docking block 120 preferably interlocks with the raised lip 123 of the quick swap mounting plate 118. Alternatively, or in addition to the raised lip, coupling of the mounting plate 118 and the docking block 120 may be achieved using screws and/or other fasteners.

FIGS. 3-7 show one version of a quick swap top mountable camera mount system 100, represented by the schematic shown in FIG. 2. FIGS. 8A-11 show alternative components and arrangements, which may be used with quick swap top mountable camera mount systems. These alternative components/arrangements may include a first-type power distribution plate 203 and an alternate accessory plate 303.

Figure 8A:
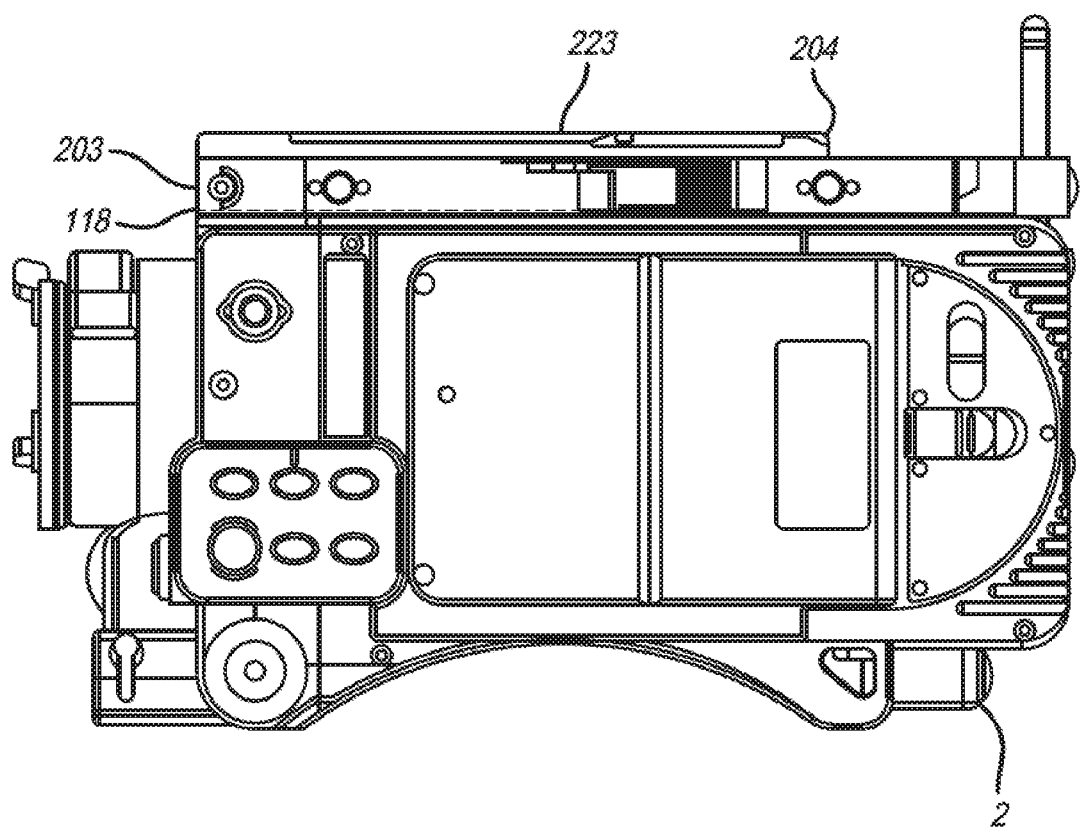
FIG. 8A shows a quick swap mounting plate, power distribution plate and camera assembly.
Figure 8B:
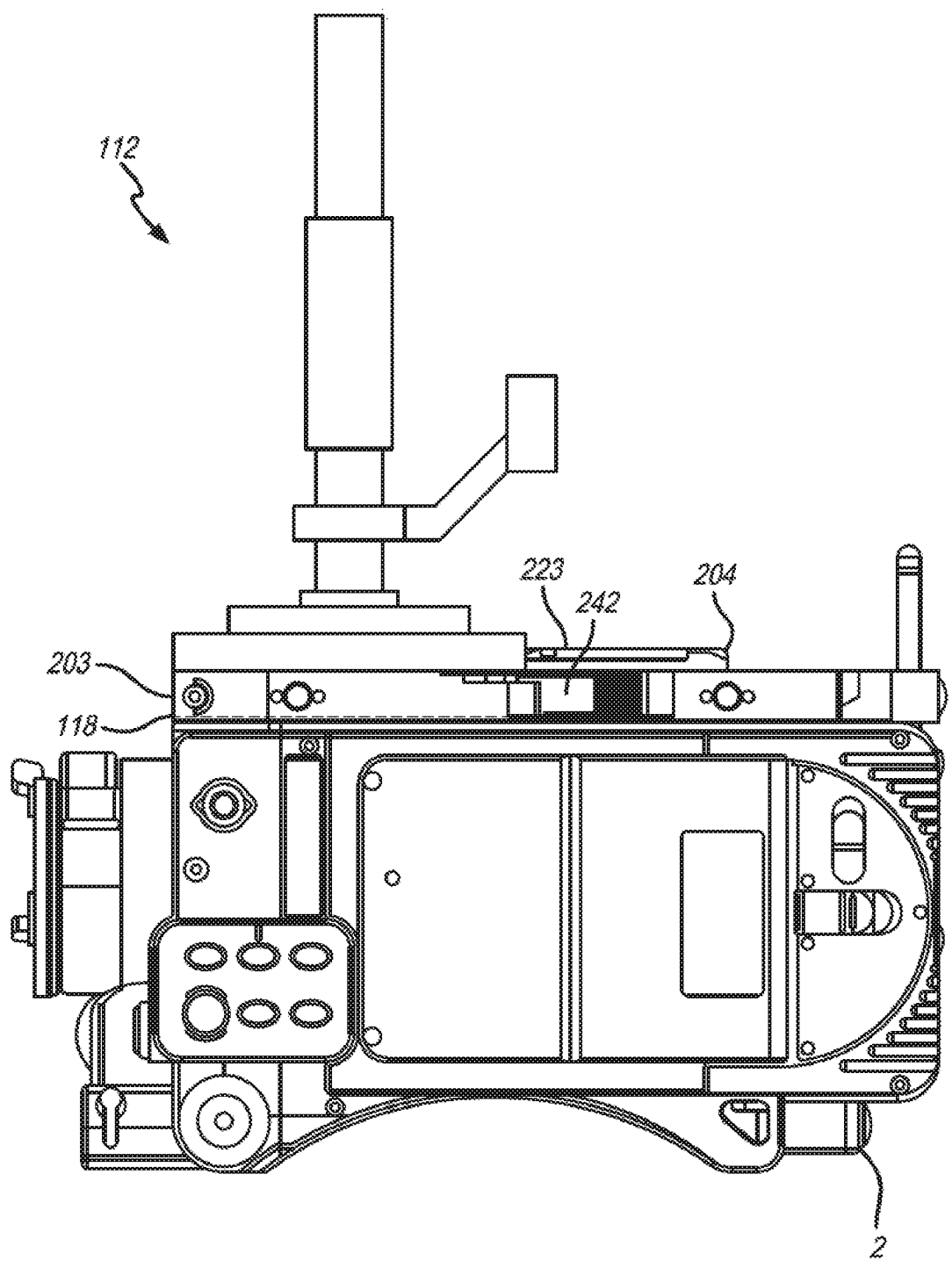
FIG. 8B shows the power distribution plate and camera assembly shown in FIG. 8A coupled to a quick swap low mode mount.
Figure 8C:
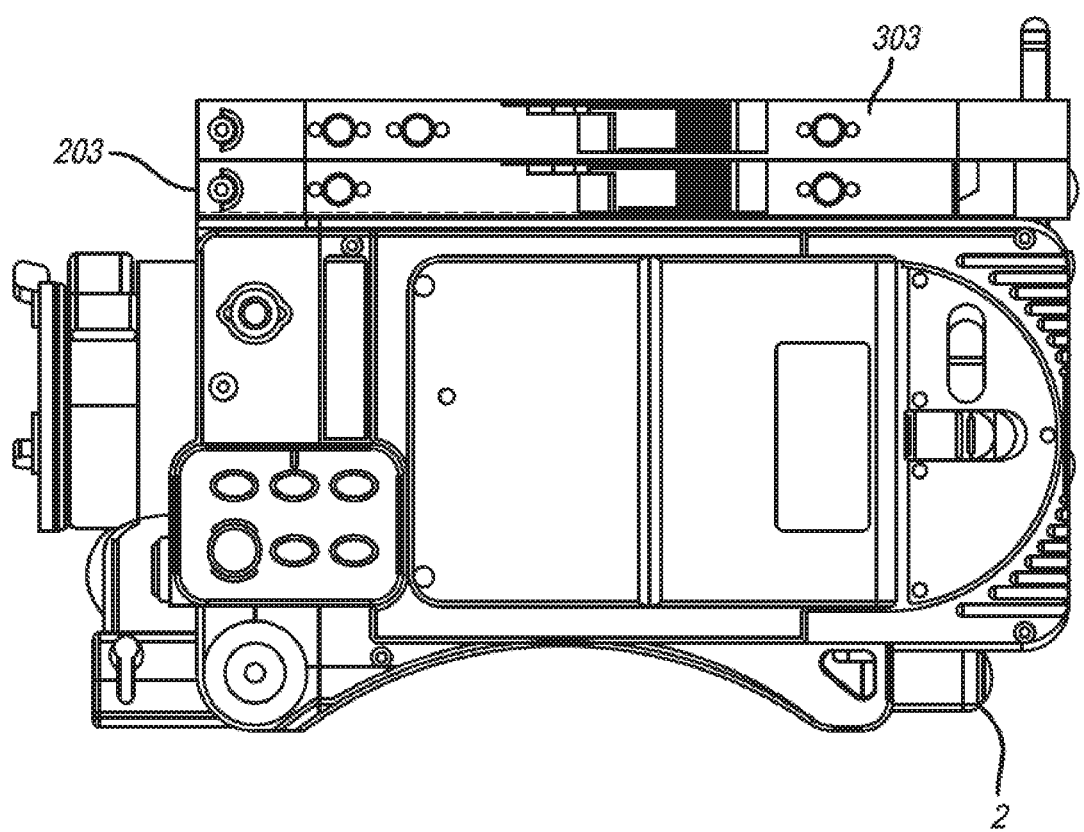
FIG. 8C shows a power distribution plate positioned on top of an alternate accessory plate, which is mounted to a camera, using a quick swap mounting plate.
Figure 12:
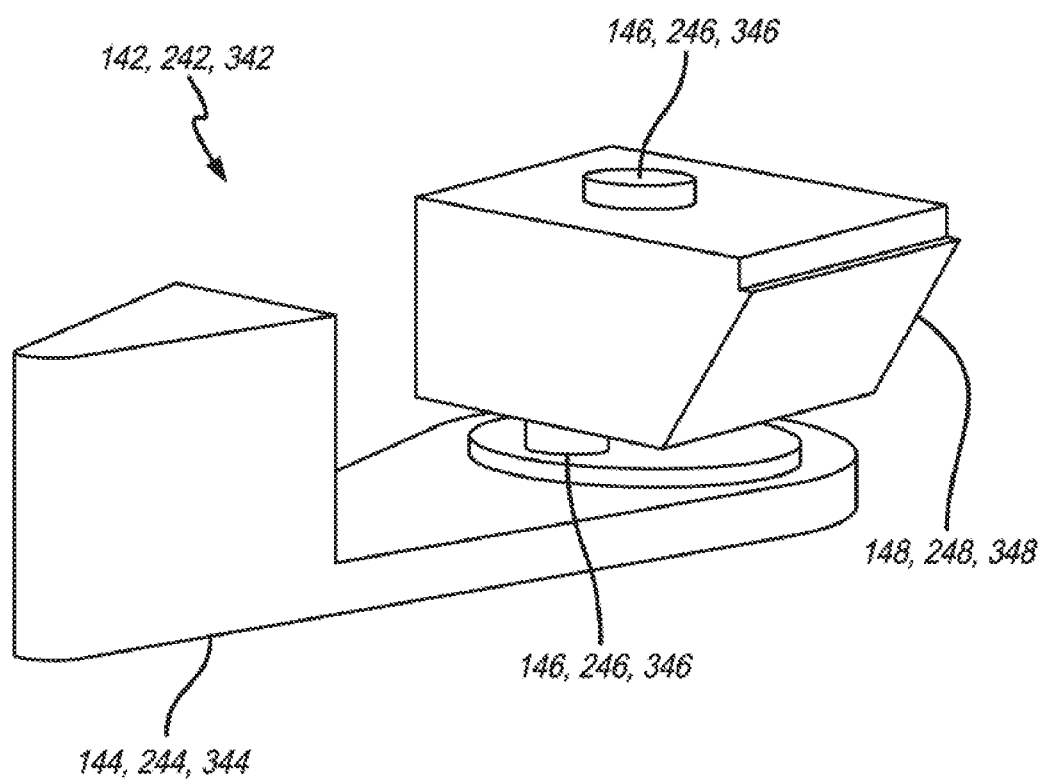
FIG. 12 shows an embodiment of a quick release and lock mechanism, which may be incorporated into a quick swap camera top accessory plate, a power distribution plate, or an accessory plate.

Either the power distribution plate 203, the alternate accessory plate 303 or the accessory plate 116 of a handheld top mount 110 may be coupled to and positioned atop a quick swap mounting plate 118 (represented by dashed lines shown in FIG. 8A). The power distribution plate 203 includes a power distribution plate mounting surface 204, having a plurality of apertures 236 of various sizes and shapes. These apertures are incorporated into the mounting surface 204 to lighten the overall load of the power distribution plate 203 and/or provide attachment points for coupling the power distribution plate 203 to other system components. Like the mounting plate 118, the mounting surface 204 includes a raised lip 223, which can interlock with either a handheld top mount, an accessory plate alone or a low mode mount (FIG. 8B). Each plate 203, 303 also includes at least one quick release and locking mechanism 242, a cavity 233, and a cover 234 and has the same elements as the release and lock mechanism incorporated into the accessory plate 116, as shown in FIG. 12. These elements include and a lever 244, one or more rotary elements 246 and a block 248. In an alternative arrangement, as shown in FIG. 8C, two plates 203, 303 may be stacked.

FIGS. 9A-10C, show a power distribution plate 302, including a plate mounting surface 304 on a power distribution plate platform 330. The power distribution plate 302 also includes a plurality of apertures 336 of various sizes, a raised lip 323, and at least one quick release and lock mechanism 342 with a cover 334. Like the accessory plates, the apertures are provided to lighten the overall load and/or provide attachment points for coupling the power distribution plate to other system components.

The power distribution plate platform 330 includes a front platform end 331*a* and a rear platform end 331*b*, a power distribution plate channel 329 configured to receive the quick swap mounting plate, a primary female alignment element 382*a* and a secondary female alignment element 382*b*. These female alignment elements are further configured to couple with the quick swap mounting plate 118. Profiled surfaces 392*a*, 392*b* of each female alignment element respectively form a primary socket 394*a* and a secondary socket 394*b*. The primary socket 394*a* has as a complementary shape to receive the primary male alignment element 180*a* of the quick swap mounting plate. Similarly, the secondary socket 394*b* has as a complementary shape to receive the secondary male alignment element 180*b* of the quick swap mounting plate 118.

The power distribution plate also includes a side wall 305 with a series of formations 306. These formations are configured to house power connectors for power distribution.

Figure 9A:
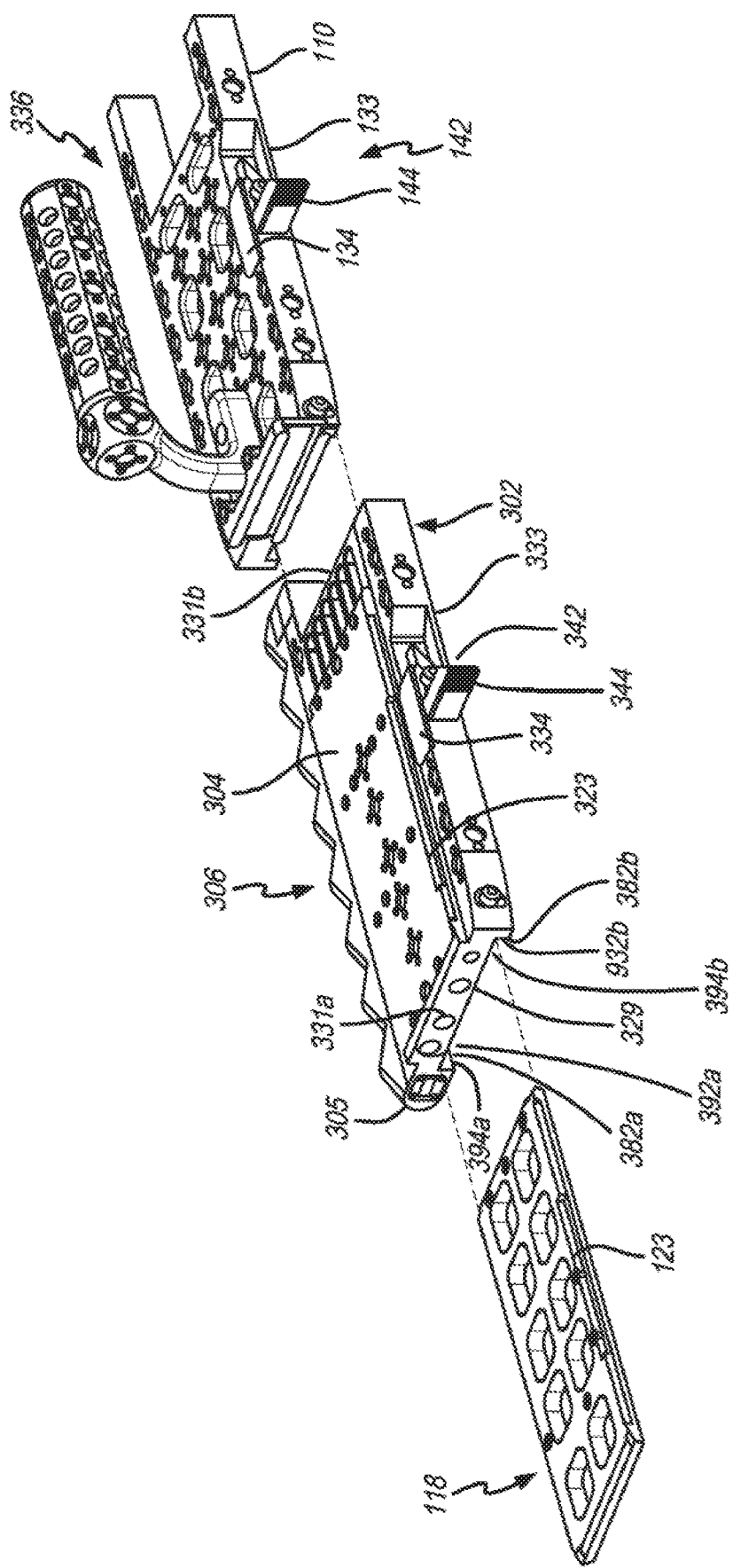
FIG. 9A shows a quick swap mounting plate and quick swap handheld top mount in alignment with a power distribution plate.
Figure 9B:
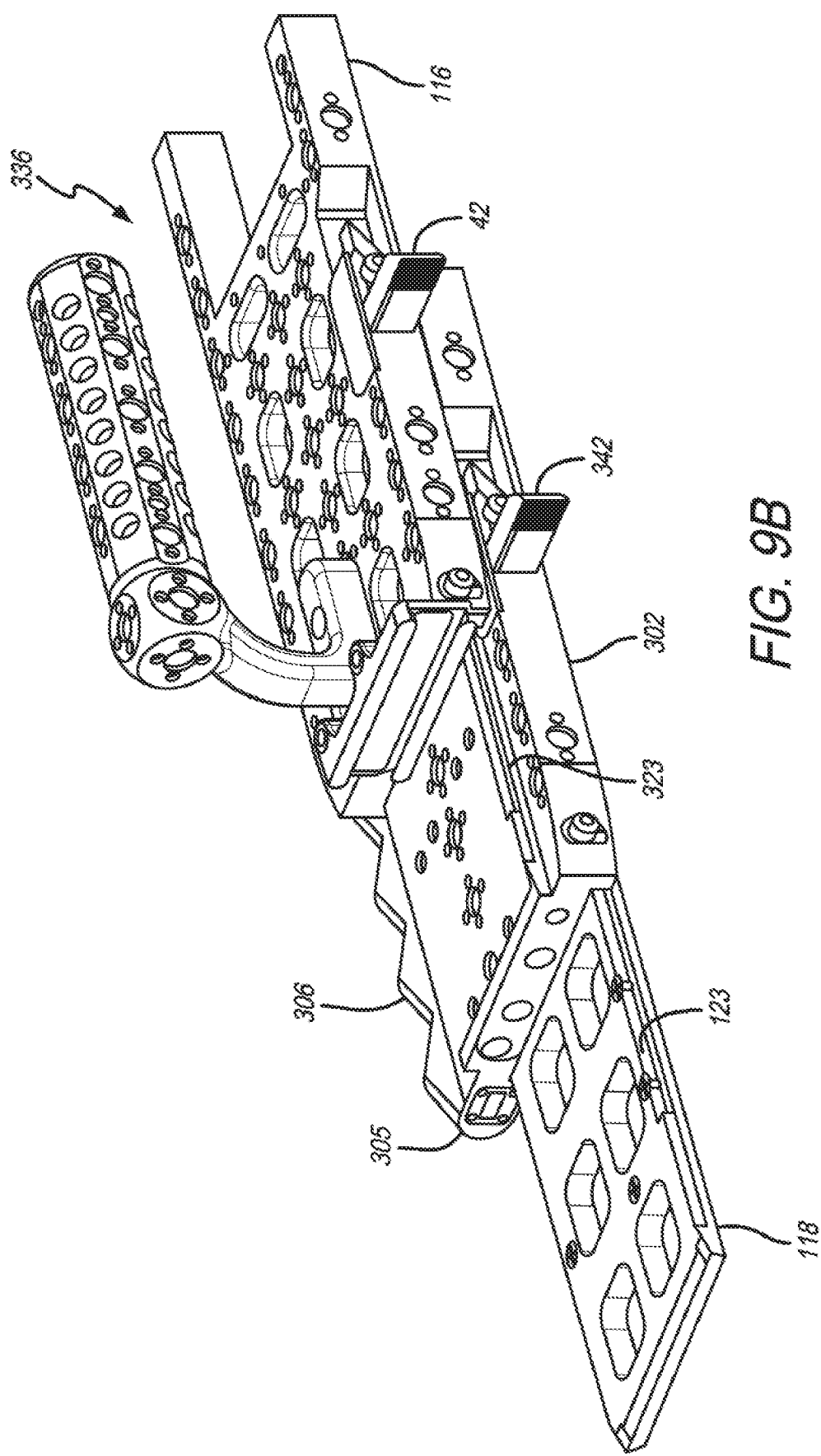
FIG. 9B shows a quick swap mounting plate and quick swap handheld top mount partially assembled with a power distribution plate.
Figure 9C:
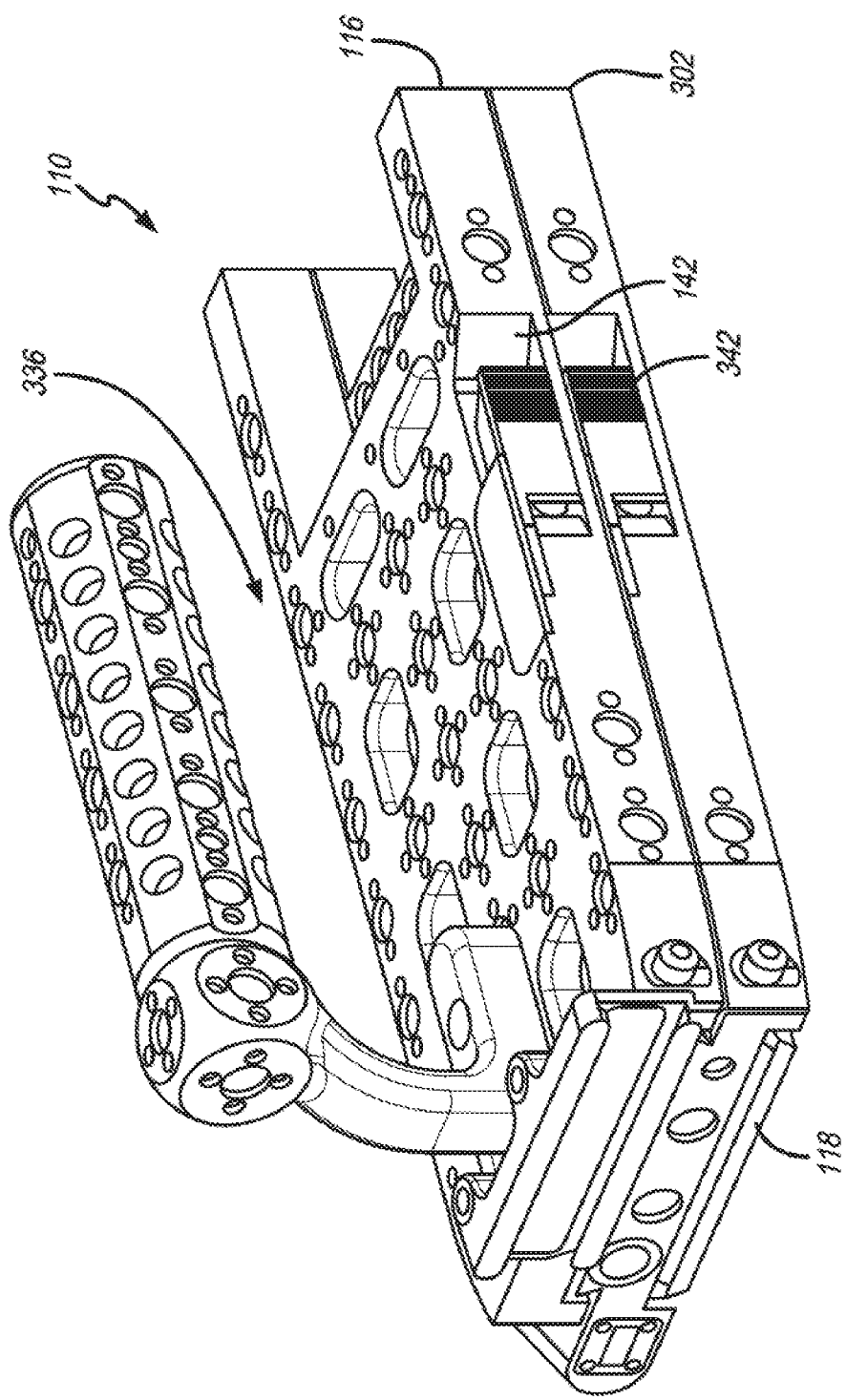
FIG. 9C shows a quick swap mounting plate and quick swap handheld top mount assembled with a power distribution plate.
Figure 10A:
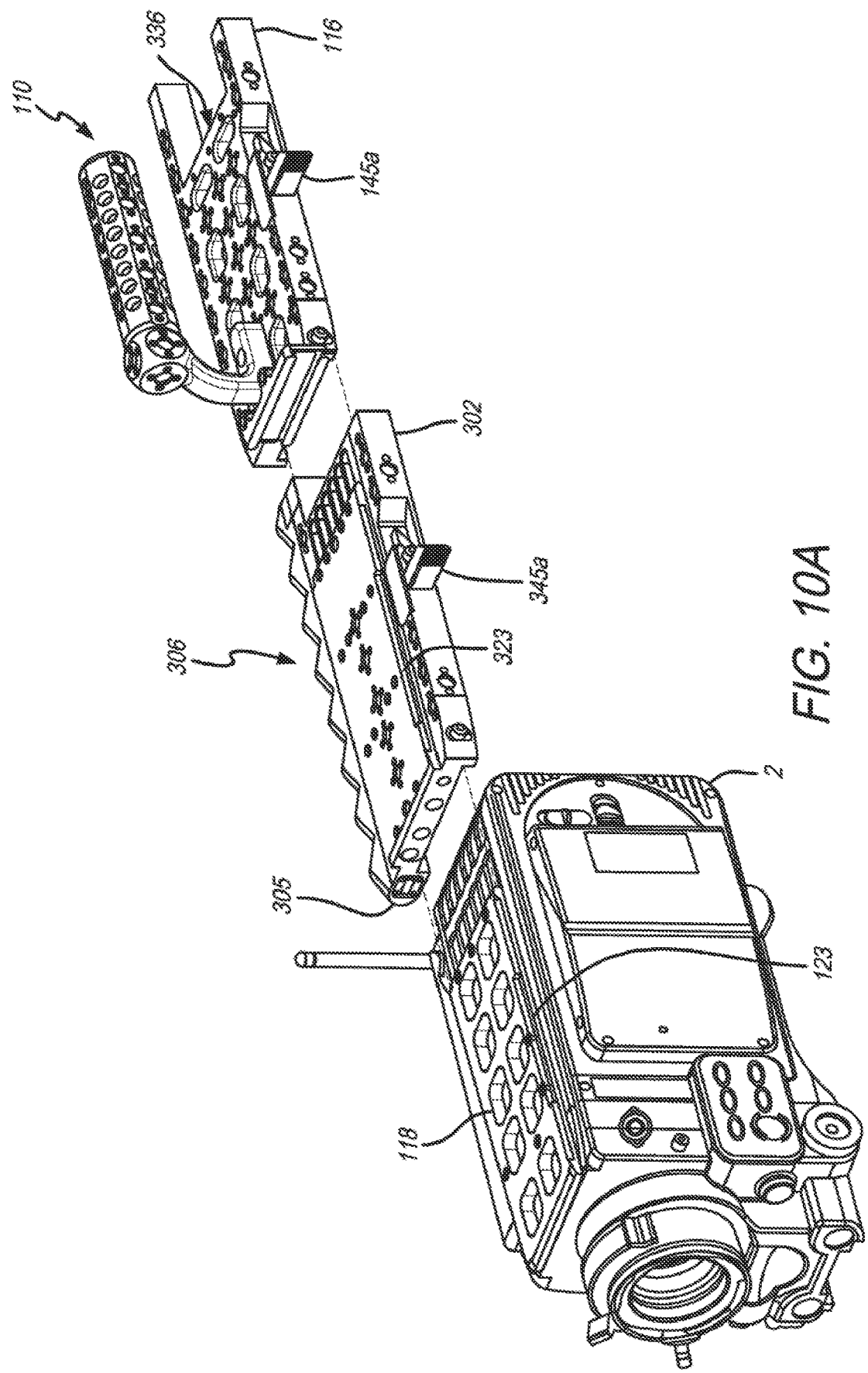
FIG. 10A shows a quick swap mounting plate mounted onto a camera, and a quick swap handheld top mount in alignment with a power distribution plate.
Figure 10B:
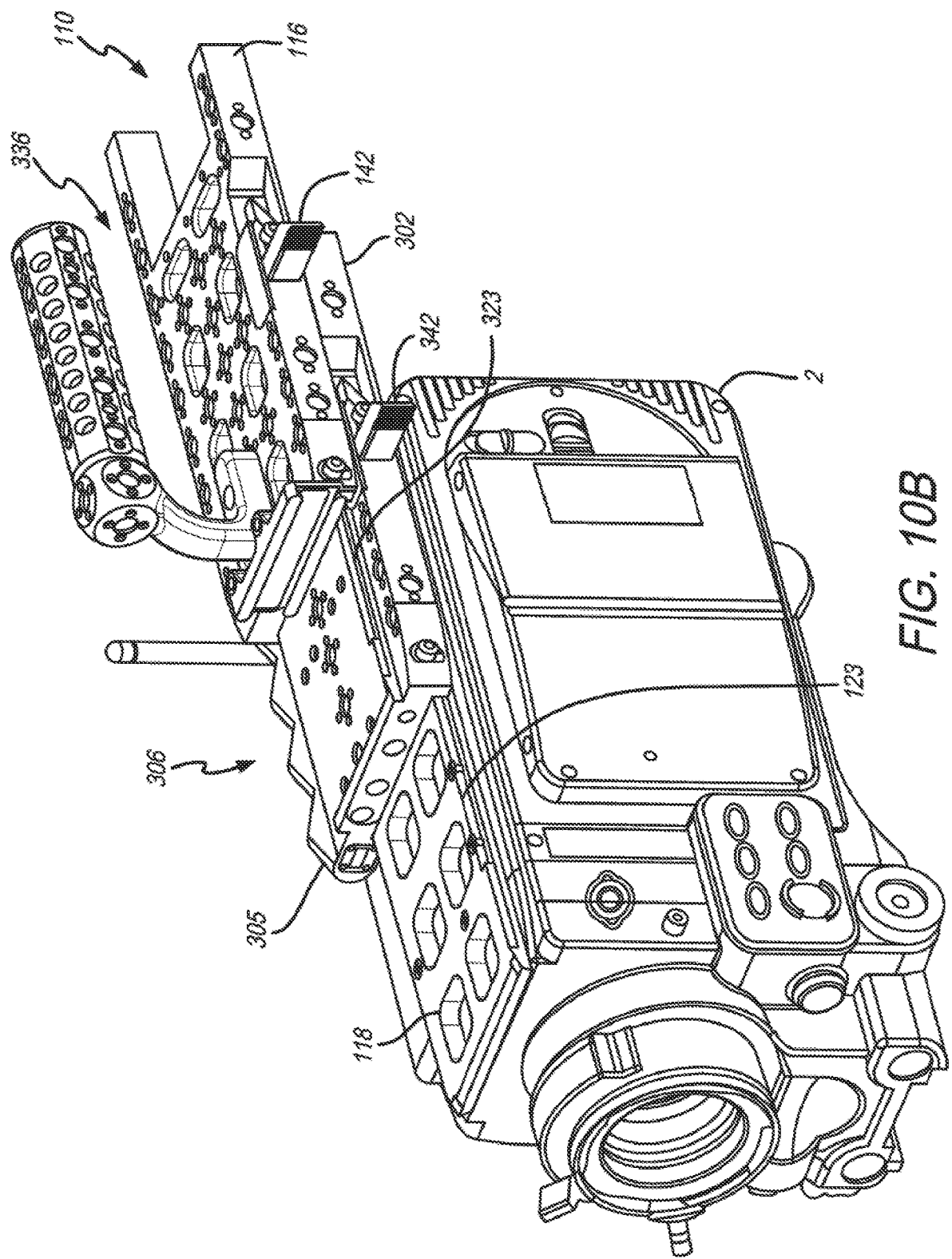
FIG. 10B shows a quick swap mounting plate mounted onto a camera and a quick swap handheld top mount partially assembled with a power distribution plate.
Figure 10C:
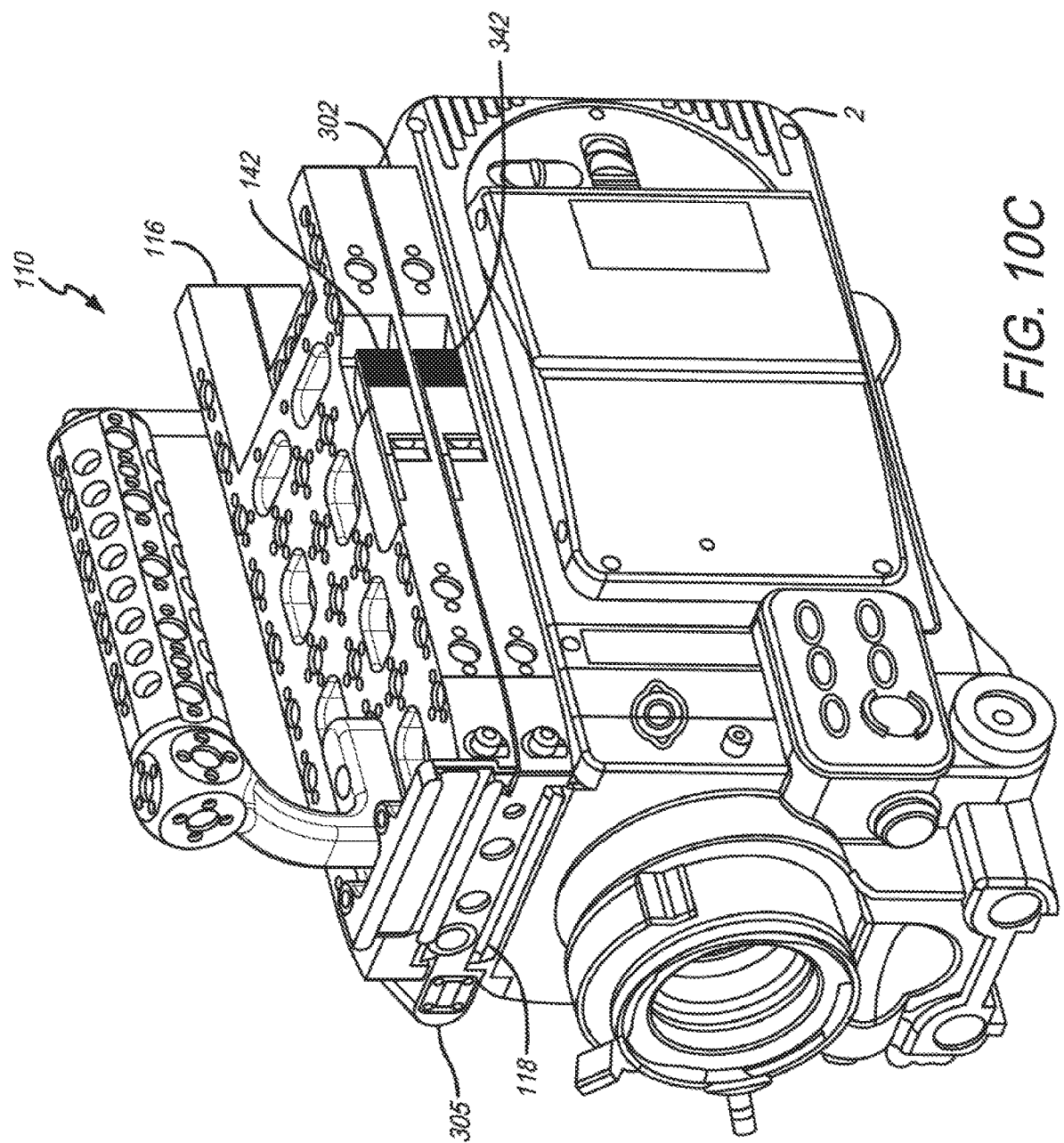
FIG. 10C shows a quick swap mounting, a camera, and a quick swap handheld top mount fully assembled with a power distribution plate.
Figure 11:
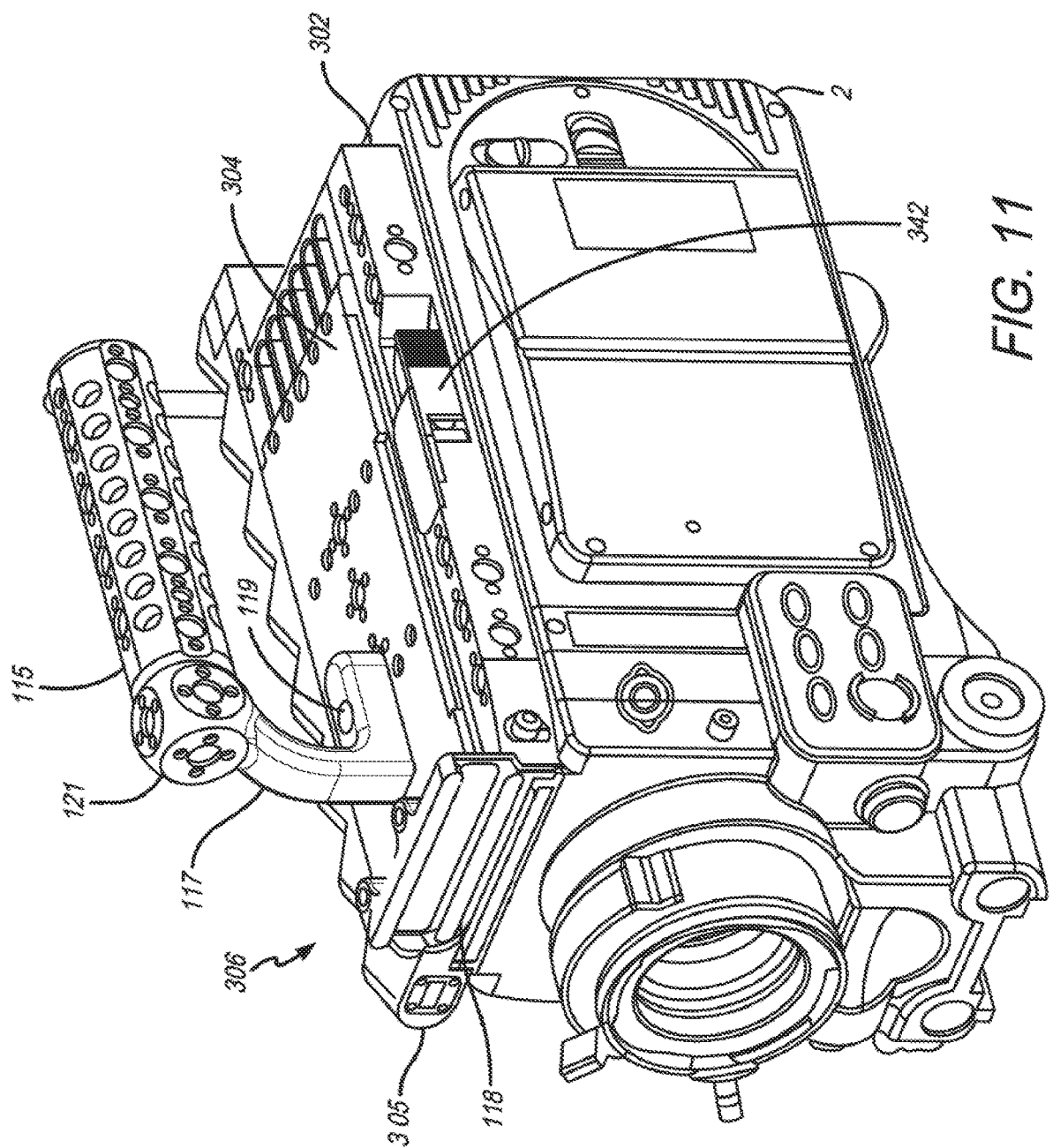
FIG. 11 shows a perspective view of a camera, power distribution plate, and a handle assembly.

The quick release and lock mechanism 342 of the power distribution plate 203, and the accessory plate 303 incorporates the same elements into a cavity 333 as the release and lock mechanism incorporated into the accessory plate 116. As shown in FIG. 12, these elements include a lever 344, one or more rotary elements 346 and a block 348. Each of these elements facilitates coupling and decoupling of the plates 203, 303 to a quick swap handheld top mount 110, or a quick swap mounting plate 118 FIG. 9A-9C show examples of how a mounting plate 118, a power distribution plate 302, a quick swap accessory plate 116 may be aligned and assembled. FIG. 10A-10C show examples of how a mounting plate 118, a power distribution plate 302, a quick swap accessory plate 118, and camera 2 may be aligned and assembled. FIG. 11 shows another alternative system arrangement. Here, a handle 114 is connected directly to a plate mounting surface 304, using a fastener 119.

While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A quick swap mount system a camera comprising:
   a mounting plate comprising:
      an outer body having an outside edge defined by first and second pairs of opposed outside edge surfaces, wherein one of the outside edge surfaces includes an engagement surface centrally positioned along such outside edge surface and that is configured differently from remaining portions of such outside edge surface that extend longitudinally away from the engagement surface; and
      an inner body portion having a plurality of bores configured to facilitate attachment of the mounting plate to a top surface of a camera; and
   an accessory plate configured to engage the mounting plate and comprising an outside edge defined by opposed edge surfaces, wherein one of the edge surfaces comprises a quick release and lock mechanism that includes a lever connected with one or more rotary elements disposed within the accessory plate and that are connected with a block, wherein when the accessory plate and mounting plate are connected with one another movement of the lever in one direction causes the block to engage the mounting plate engagement surface to provide a locked state between the mounting plate and the accessory plate, and wherein movement of the lever in an opposite direction causes the block to disengage the mounting plate engagement surface to provide an unlocked state between the mounting plate and the accessory plate.

2. The quick swap mount system as recited in claim 1, wherein the lever is flush with the accessory plate edge surface when placed in a locked state.

3. The quick swap mount system as recited in claim 2, wherein the lever projects outwardly from the accessory plate edge surface when placed in an unlocked state.

4. The quick swap mount system as recited in claim 1, wherein when in a locked state the block is pressed inwardly away from the accessory plate edge surface into contact with the engagement surface.

5. The quick swap mount system as recited in claim 2, wherein when an unlocked state the block is moved outwardly towards the accessory plate edge surface away from contact with the engagement surface.

6. The quick swap mount system as recited in claim 1, wherein the lever extends into a cavity that is recessed into the accessory plate edge surface and wherein the one or more rotary elements are disposed within the cavity and positioned perpendicular to the lever.

7. The quick swap mount system as recited in claim 1, wherein the mounting plate is a handheld mount comprising a handle that projects outwardly therefrom to enable a user to hold a camera that is disposed beneath the handle.

8. The quick swap mount system as recited in claim 1, further comprising a power distribution plate interposed between the mounting plate and the accessory plate, wherein the distribution plate is configured to mate with both the mounting plate and top mount.

9. The quick swap mount system as recited in claim 8, wherein the power distribution plate comprises:
   an engagement surface positioned along a partial section of an outside edge surface and that is configured to form a locked attachment with the quick release lock mechanism of the accessory plate; and
   a quick release and lock mechanism that is disposed along the outside edge surface that includes the engagement surface and that is configured to form a locked attachment with the engagement surface of the mounting plate.

10. A quick swap camera mount system, comprising:
    a camera;
    a mounting plate attached to a top surface of the camera, comprising:
       an outside body portion with opposed pairs of first and second outside edges, wherein one of the outside edges comprises an engagement surface extending along only a center portion of such outside edge; and
       an inner body portion comprising a plurality of bores having fasteners therein for attaching the mounting plate to the top surface of the camera; and
    an accessory plate configured to laterally engage the mounting plate, the accessory plate comprising opposed first outside edges configured to slidably engage the mounting plate first or second pair of opposed outside edges, wherein the accessory plate comprises a quick release and lock mechanism disposed along an outside edge and that includes a lever attached with one or more rotary elements disposed within the accessory plate, the quick release and lock mechanism including a block that is connected with the lever and that is moved into contact with the mounting plate engagement surface when the lever is moved into a locked position flush with the outside edge, and wherein the block is moved out of contact with the mounting plate engagement surface when the lever is moved into an unlocked position extending outwardly from the outside edge.

11. The quick swap camera mount system as recited in claim 10, wherein the lever pivots from a recessed cavity in the accessory plate outside edge, and wherein the one or more rotary elements are disposed within the recessed cavity.

12. The quick swap camera mount system as recited in claim 10, wherein the engagement surface comprises an inwardly recessed portion of the mounting plate outed edge.

13. The quick swap camera mount system as recited in claim 10, wherein the lever pivots from a locked to an unlocked state relative to the one or more rotary elements that are positioned perpendicular to the direction of lever travel.

14. The quick swap camera mount system as recited in claim 13, wherein when the lever is moved into a locked state the one or more rotary elements cause the block to be moved downwardly relative to a bottom surface of the accessory plate and inwardly relative to the accessory plate outside edge.

15. The quick swap camera mount system as recited in claim 13, wherein when the lever is moved into an unlocked state the one or more rotary elements cause the block to be moved upwardly relative to a bottom surface of the accessory plate and outwardly relative to the accessory plate outside edge.

16. A method for forming a releasable locking attachment between an accessory plate and a top of a camera comprising:
- attaching a mounting plate to a top surface of a camera, the mounting plate comprising an outer body portion with opposed pairs of first and second outside edges, wherein one of the outside edges comprises an engagement surface extending along a center portion of outside edge, and comprising an inner body portion comprising a plurality of bores having fasteners therein for attaching the mounting plate to the top surface of the camera;
- laterally slidable engaging an accessory plate on top of the mounting plate, wherein the accessory plate includes a quick release and lock mechanism disposed along an outside edge that is positioned adjacent the mounting plate engagement surface, wherein the quick release and lock mechanism comprises a lever that is connected with a block disposed within the accessory plate;
- moving the lever from an unlocked state to a locked state by pivoting the lever towards the accessory plate outside edge to cause the block to be moved downwardly relative to a bottom surface of the accessory plate and inwardly relative to the accessory plate outside edge and into contact with the mounting plate engagement surface; and
- moving the lever from a locked state to an unlock state by pivoting the lever away from the accessory plate outside edge to cause the block to be moved upwardly relative to the bottom surface of the accessory plate and outwardly relative to the accessory plate outside edge and away from contact with the mounting plate engagement surface.

17. The method as recited in claim 16, wherein when the lever is in a locked state the lever is flush with the accessory plate outside edge, and wherein when the lever is in an unlocked state the lever is disposed outwardly away from the accessory plate outside edge.

18. The method as recited in claim 16, wherein during the steps of moving the lever from the unlocked state and moving the lever from the locked state, the lever pivoted from within the accessory plate and is connected with one or more rotary elements that are connected with the block.

19. The method as recited in claim 16, wherein during the step of moving the lever into a locked state, the block engages the mounting plate engagement surface that is a recessed section of the outside edge, and wherein the remaining portions of the outside surface on opposed ends of the recess section are configured differently from the recessed section.

20. The method as recited in claim 16, wherein the during the step of moving the lever to a locked state, the lever is pivoted into a recessed cavity disposed along the accessory plate outside edge.

* * * * *